US 6,678,689 B2

(12) United States Patent
Yoon et al.

(10) Patent No.: US 6,678,689 B2
(45) Date of Patent: Jan. 13, 2004

(54) MULTIMEDIA STRUCTURE AND METHOD FOR BROWSING MULTIMEDIA WITH DEFINED PRIORITY OF MULTIMEDIA SEGMENTS AND SEMANTIC ELEMENTS

(75) Inventors: Kyoung Ro Yoon, Seoul (KR); Sung Bae Jun, Seoul (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 09/740,852

(22) Filed: Dec. 21, 2000

(65) Prior Publication Data

US 2001/0056427 A1 Dec. 27, 2001

(30) Foreign Application Priority Data

Dec. 30, 1999 (KR) .......................................... 1999/65853

(51) Int. Cl.[7] .............................................. G06F 17/30
(52) U.S. Cl. ..................................... 707/101; 707/104.1
(58) Field of Search ................................ 707/1, 2, 3, 5, 707/6, 100, 101, 102, 104.1

(56) References Cited

U.S. PATENT DOCUMENTS

| 5,630,121 A | * | 5/1997 | Braden-Harder et al. ... 707/102 |
| 6,243,713 B1 | * | 6/2001 | Nelson et al. ............ 707/104.1 |
| 6,278,446 B1 | * | 8/2001 | Liou et al. ................... 345/700 |

FOREIGN PATENT DOCUMENTS

EP          1 111 612 A1  *  6/2001  ........... G11B/27/00

* cited by examiner

Primary Examiner—Diane D. Mizrahi
(74) Attorney, Agent, or Firm—Fleshner & Kim, LLP

(57) ABSTRACT

A more efficient data structure and method for browsing a multimedia is disclosed. In the present invention, link information between segments and semantic elements of a multimedia data structure is generated with minimal use of storage. Also, priority or weight of segments is represented based on semantic elements and priority or weight of semantic elements is represented based on segments to allow a search of multimedia based on content. The priority or weight information is represented as an attribute of the link information to increase the efficiency of the storage and a method of automatically extracting the priority or weight information is disclosed.

26 Claims, 4 Drawing Sheets

FIG.5

| connector ID | segment locater | semantic element locater | semantic based importance | segment based importance |
|---|---|---|---|---|
| L1 | S1 | M1 | 0.97 | 0.3 |
| L2 | S1 | M2 | 0.7 | 0.8 |
| L3 | S1 | M3 | 0.5 | 0.3 |
| L4 | S1 | M4 | 0.4 | 0.9 |
| L5 | S2 | M1 | 0.2 | 0.7 |
| L6 | S2 | M2 | 0.5 | 0.2 |
| L7 | S3 | M2 | 0.9 | 0.5 |
| L8 | S3 | M3 | 0.2 | 0.4 |
| L9 | S4 | M4 | 0.8 | 0.6 |
| ... | ... | ... | ... | ... |
| $L_i$ | $S_j$ | $M_k$ | ... | ... |

MULTIMEDIA STRUCTURE AND METHOD FOR BROWSING MULTIMEDIA WITH DEFINED PRIORITY OF MULTIMEDIA SEGMENTS AND SEMANTIC ELEMENTS

BACKGROUND OF THE INVENTION

1. Field of the Invention

The present invention relates to a multimedia browser, and more particularly to a structure and method for browsing the multimedia with defined priorities and/or weights of multimedia data segments and semantic elements.

2. Description of the Related Art

Contents of a multimedia program are typically divided into a structural content and a semantic content.

The structural content represents how a multimedia program is physically and logically organized. For example, for a news program, a structural content may be organized by an initial title portion, a headline news portion, and a main news portion including news items. For a drama or a movie, a structural content may be organized according to video sections of the drama or movie story as developed with respect to time. Here, the headline news portion of a news program deals with a plurality of news items and may be further divided into sections corresponding to each news item. Similarly, the main news portion may further be divided into sections corresponding to news items and each news item may be divided into anchor shots and reporter shots.

As described above, division of a multimedia program into several portions is called segmentation and the divided portions are called segments. That is, the structural content is generally described with segments. In the above example, if the news program is logically divided, the news program would have a tree structure representing an example of the structural content.

FIG. 1 shows an example structure information of an audio/video stream. As shown in FIG. 1, the audio/video stream may be represented by a group of scene segments, and the scene segments may be described with a tree structure of shot segments. The structure information of segments is not fixed to a single structure but can have various other structure according to different viewpoints or criteria for the segmentation. Namely, different segments would result from segmentation with reference to audio information, visual information, or logical information. However, any such information is called structure content or structure information and each segment is called a structure element.

On the other hand, the semantic content is information representing human perception and an object-oriented description of a multimedia program. The semantic content may include abstract concepts such as fear, sadness, and happiness; objects such as characters, places, or things appearing in the multimedia program; events which occur in the multimedia program; and relation connecting the objects and events. For example, in a drama, the actors, the character roles, and events describing a plot would be the semantic content; and each actor, character role, and event would be the semantic elements. If the semantic elements are defined by relations among the elements, a semantic structure would be generated.

FIG. 2 is an example semantic information for a motion picture such as a drama or a movie. As shown, the story of Pinocchio is represented by a semantic oriented description with characters such as Geppetto and Pinocchio, and relations and roles between Geppetto and Pinocchio.

The semantic elements and structure information as described above has relations. The relation may be represented by 'a semantic element described in a segment of a selected program' or in reverse, 'a segment including a particular semantic element.' There are other various methods and structures for describing the relations, depending on the way the semantic elements and the structural information are formed. For the examples shown in FIGS. 1 and 2, there may be information indicating the segments in which the character Pinocchio appears or there may be information on a segment indicating the objects and events shown in the segment such as Pinocchio.

Using the above link information, i.e. the relations, users may easily browse a multimedia section or content as desired. Since a multimedia data includes the link information of the structure information and semantic information, users can search for a specific segment of a video or audio to allow a more convenient browsing. That is, users can specifically browse portions of a video rather than watching the whole video, and effectively understand the contents of the whole video in a short period of time by browsing a summary of the video content.

For such browsing, each semantic element includes information connecting the semantic elements to each corresponding segment, or each segment includes information connecting the segment to each corresponding semantic element. Moreover, both are organized into a data structure including a priority or a key word for each segment or semantic element. Accordingly, a multimedia has video segments and semantic elements which allow browsing by connecting semantic element information based on video segments or by connecting video segments based on semantic elements.

Furthermore, a video is divided into units of a shot and multimedia browsing may be carried out based upon a shot segmentation and a shot clustering by which each shot is divided and grouped into units of a scene. Namely, using the shot information and scene information, key frames which represent a scene can be set for a video browsing and searching. Therefore, users may selectively browse or search a specific portion of a video stream. For example, a video browsing method has been proposed using a hierarchically decomposed or a scene transition graph describing a temporal relationship among scenes.

As described above, to allow a browsing of a specific portion of a video, typical video indexing systems establish a data structure based on each semantic characteristic element. That is, a browsing based on appearances of characters or on event sections is provided. However, in such multimedia browser based on content, a significant amount of overlap occurs to describe each semantic elements of each segments or each segments of semantic elements.

SUMMARY OF THE INVENTION

Accordingly, an object of the present invention is to solve at least the problems and disadvantages of the related art.

Therefore, an object of the present invention is to provide a data structure and method for a more efficient browsing of data.

Another object of the present invention is to provide a data structure and method with reduced overlapping in description of data.

A still another object of the present invention is to provide a data structure to describe priority and/or weight (priority/ weight) information based on semantic elements which is described with link information between structure elements and semantic elements, and a structure for describing the priority/weight information in which qualitative information representing how precisely a structure element describes a semantic element is quantitatively described in the link information.

A further object of the present invention is to provide a structure for describing priority/weight information based on segments in which information representing priority/weight of semantic elements is differentiated depending on the semantic elements.

A still further object of the present invention is to provide a structure for defining and describing individual priority/weight of segments and semantic elements of a multimedia in which link information includes both priority/weight information based on the semantic elements and priority/weight information based on the segments to describe individual priority/weight for corresponding elements.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a multimedia data structure includes link information for connecting a semantic element structure and a segment information structure, where the link information includes priority/weight information between semantic elements and segments as an attribute, when a multimedia data includes the semantic element structure describing a content of a multimedia and the segment information structure of the multimedia for browsing the multimedia based on content. The priority/weight information may further includes information representing how precise the priority/weight is described.

In the above embodiment, the priority/weight information may be priority/weight information based on the semantic elements representing the priority/weight of semantic information related to a segment. The priority/weight information may be priority/weight information of structure elements which varies depending on the semantic elements. The priority/weight information may also be priority information based on semantic elements, which represents priority/weight of the segments related to a semantic element or priority/weight information of semantic elements which varies depending on the structure elements.

Moreover, the priority/weight information may be information based on both the semantic elements and the segments. In such case, the link information including the priority/weight information may have additional information describing connection relationships. Furthermore, the priority information may be described as a segment locator for locating a corresponding segment when link information includes the priority/weight information based on the semantic elements. The priority/weight information may also be described as a semantic element locator for locating a corresponding semantic element when the link information includes the priority/weight information based on the segment.

Another embodiment of a multimedia data structure according to the present invention includes link information for connecting a semantic element and a segment wherein the link information includes priority/weight information of the structure element which varies depending on the semantic element, when a multimedia data includes the semantic element structure describing the contents of a multimedia and the segment information structure of the multimedia for browsing the multimedia based on the contents.

A still another embodiment of a multimedia data structure according to the present invention includes link information for connecting a semantic element and a segment wherein the link information includes priority/weight information of the semantic element which varies depending on the structure element, when a multimedia data includes the semantic element structure describing the contents of a multimedia and the segment information structure of the multimedia for browsing the multimedia based on the contents.

A further embodiment of a multimedia data structure according to the present invention includes link information for connecting a semantic element and a segment wherein the link information includes both priority/weight information of the structure element which varies depending on the semantic element and priority/weight information of the semantic element which varies depending on the structure element, when a multimedia data includes the semantic element structure describing the contents of a multimedia and the segment information structure of the multimedia for browsing the multimedia based on content.

A method for browsing a multimedia according to the present invention, includes selecting a semantic element or segment information, selecting a link information of the selected semantic element or segment, and displaying corresponding segment or semantic element information in sequence according to the priority/weight between the corresponding segment element and segment which was obtained by the link information, wherein a multimedia data includes a semantic element structure describing a content of a multimedia and a segment information structure of the multimedia for browsing the multimedia based on content.

Another method for browsing a multimedia according to the present invention, includes assigning 'semantic element n' as a semantic element, selecting 'semantic element n' and reading link information of segments assigned by 'semantic element n,' determining which segments are connected to 'semantic element n' from the link information and reading priority/weight of the connection from the priority information included in the corresponding link information, and displaying the corresponding segments in sequence according to the priority, wherein the priority/weight information based on the semantic element is described by attributes of link information with the corresponding segments.

A further embodiment of a method for browsing a multimedia according to the present invention includes assigning 'segment n' as a structure element, selecting 'segment n' and reading link information of semantic elements assigned by 'segment n,' determining which semantic elements are connected to 'segment n' from the link information and reading priority/weight of the connection from the priority/weight information included in the corresponding link information, and displaying the corresponding semantic elements in sequence according to the priority/weight, wherein priority/weight information based on the structure element described by attributes of link information with the corresponding semantic elements.

BRIEF DESCRIPTION OF THE DRAWINGS

The invention will be described in detail with reference to the following drawings in which like reference numerals refer to like elements wherein:

FIG. 5 is a view showing a structure for describing priority/weight information based on both a semantic structure and segments according to the present invention.

DESCRIPTION OF THE PREFERRED EMBODIMENTS

Reference will now be made in detail to the present invention, examples of which are illustrated in the accompanying drawings.

Figure 1:
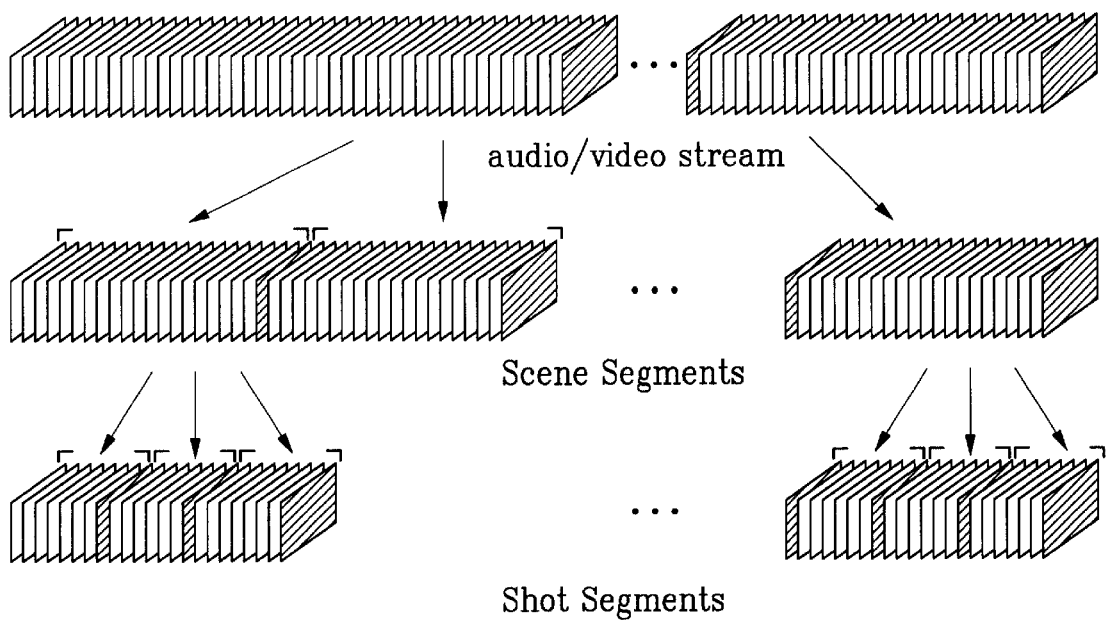
FIG. 1 is a view showing a schematic structure of audio and video information in the related art.
Figure 2:
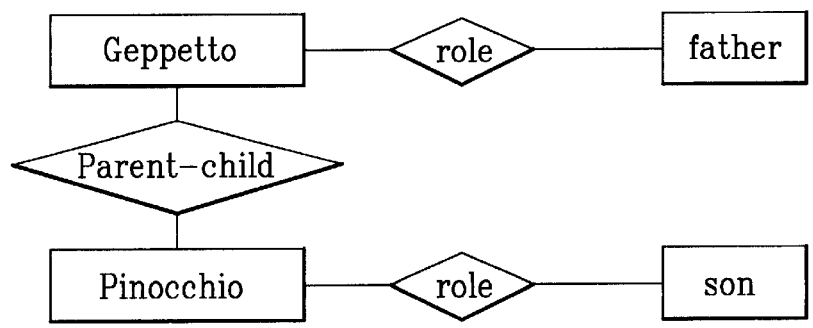
FIG. 2 is a view showing an example of semantic information of a multimedia.
Figure 3:
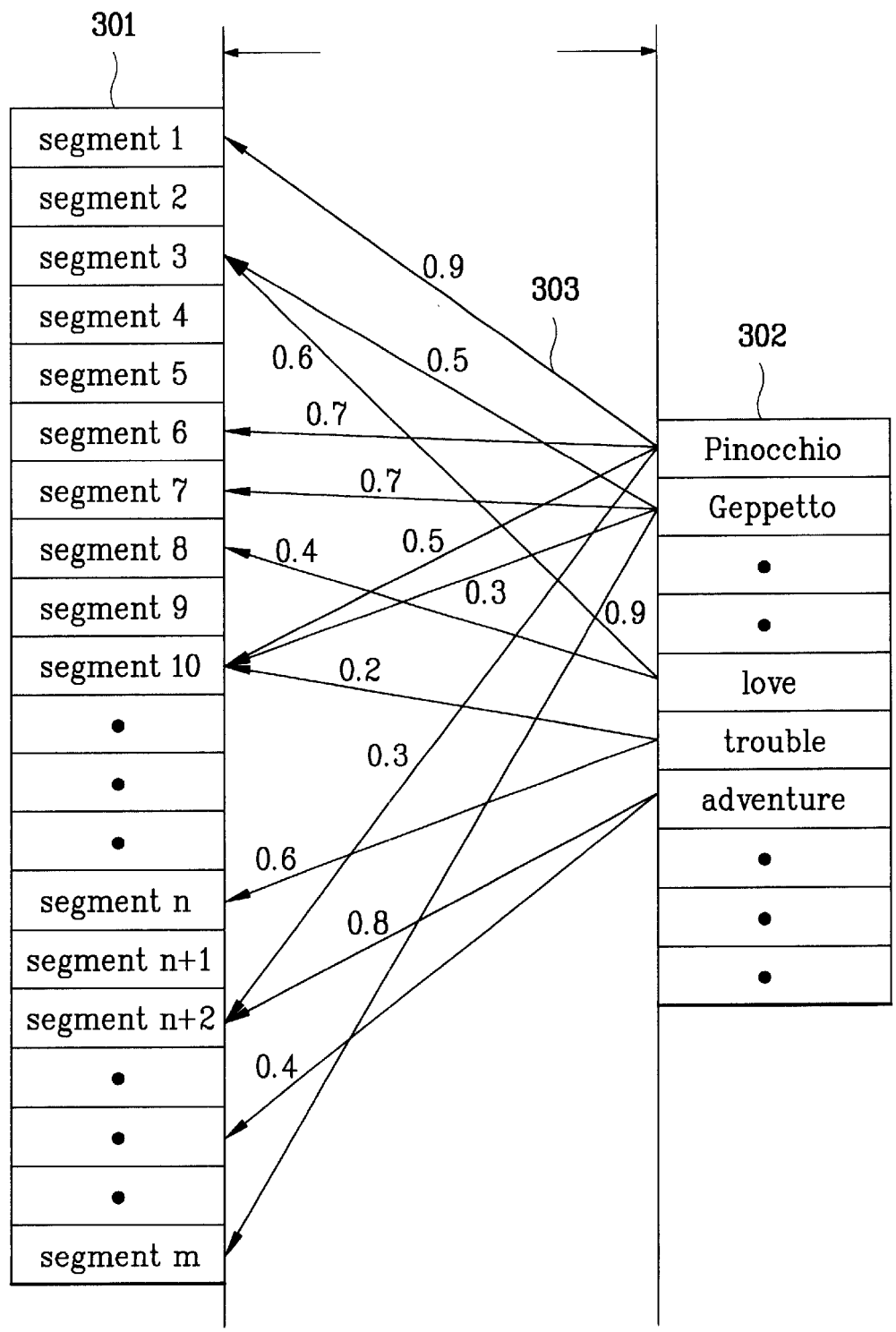
FIG. 3 is a view showing a structure for describing priority/weight information based on a semantic structure according to the present invention.
Figure 4:
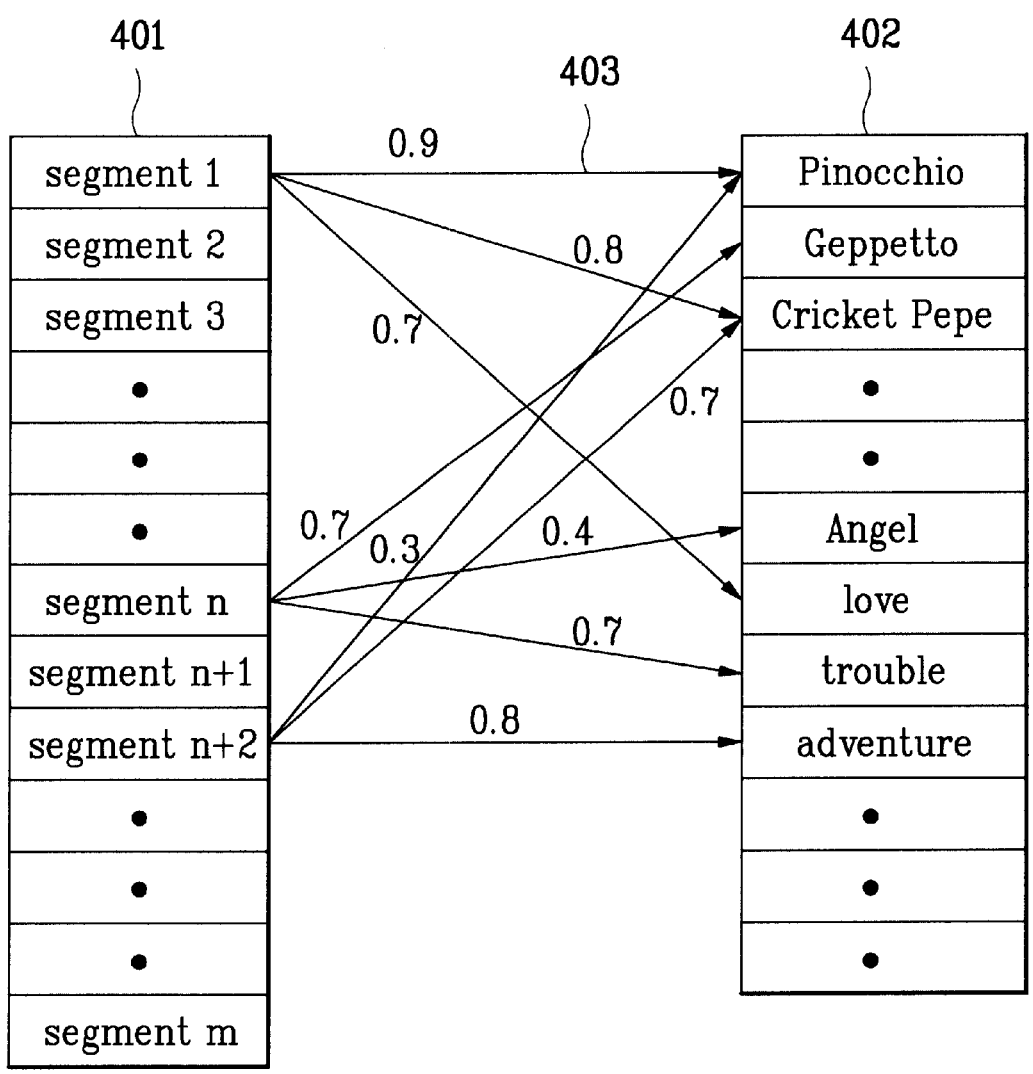
FIG. 4 is a view showing a structure for describing priority/weight information based on segments according to another embodiment of the present invention.

If a multimedia is a motion picture, the contents of the multimedia would include structure information of segments as shown in FIG. 1 and semantic elements as shown in FIG. 2. The structure information and the semantic elements have relationships and in the present invention, the relationships are links from semantic elements to segments as shown in FIG. 3 or links from segments to semantic elements as shown in FIG. 4.

Assuming that a semantic element Pinocchio is set, locators which designate segments corresponding to the semantic element Pinocchio, such as segments or segments with scenes in which Pinocchio appears, can represent a semantic based link information. Similarly, locators which designate semantic elements corresponding to a segment, such as objects or concepts in the segment, can represent a segment based link information. Here, each semantic element may have additional information independent from the semantic based link information. In the above assumption, the additional information may be, for example, the actor who represents Pinocchio or the information describing a character called Pinocchio. On the other hand, the structure information may have information independent from the segment based link information such as how and where each data segment exists.

Also, each semantic element may be described in several segments. In the example, the character Pinocchio may be defined without redundancy as an object in the semantic structure and described in several portions of a multimedia data. At this time, a 'relation locator' is necessary to link the object Pinocchio of the semantic structure to portions in which the object is described. Such portions may be segments in which Pinocchio appears in a video clip, an audio clip in which the voice of Pinocchio is recorded, photographs of Pinocchio, or character data related to Pinocchio, and can be defined as a structure element.

In the linked structure element describing semantic elements, the degree of relation between the structure elements and the semantic elements may be different. That is, in some video clips, the back of Pinocchio may appear in the background and in other video clips, the face of Pinocchio may appear in close-up. Such degrees of description or relations will be referred as a priority, weight, or importance in this invention.

The link information may represent or describe the contents of a motion picture with different focus such as on characters, events, background, or relationship changes among the characters. Moreover, when a multimedia is searched based on content, semantic based links to segments or segment based links to semantic elements would have different priorities/weights depending on a viewpoint of the user or the contents of a motion picture. For example, a section of a motion picture in which the main character Pinocchio appears may be important in understanding the development of a story, but may also be an insignificant detail with respect to the story.

If the priority/weight or importance of the links between the semantic elements and the segments are represented by an attribute of the link information, the contents of the multimedia may be browsed more efficiently and conveniently using the priority/weight information. Accordingly, in the present invention, the link information between the semantic elements and the segments includes priority/weight information of the links as an attribute. FIG. 3 is an example structure for describing the priority/weight information based on semantic elements and FIG. 4 is an example structure for describing the priority/weight information based on the structure elements.

The priority/weight information, as shown in FIGS. 3 and 4, is represented by an attribute of the links between the semantic element and the segment. The degree of the priority/weight is represented by a number.

Referring to FIG. 3, structure elements 301 include a plurality of segments and link information 303 connects corresponding segments to semantic elements 302 of a multimedia contents, where the link information 303 includes priorities.

The priority/weight of the link information 303 is represented by numbers written on arrows from the semantic elements 302 to corresponding segments 301. Here, the link information 303 may be represented by connectors, relations or locators. Thus, the priority or weight of the link information 303 may be one of an attribute of the link information 303.

In the link information 303 of FIG. 3, a semantic element Pinocchio connects to segment 1, segment 6, segment 10, and segment n+2 of the structure elements 301. Here, the priority/weight of the link information 303 to segment 1 is '0.9,' the priority/weight of the link information 303 to segments 6 and 10 are '0.5,' and the priority/weight of the link information 303 to segment n+2 is '0.3.' Assuming that the priority/weight ranges from 0 to 1 and that the priority/weight is based on sections in which Pinocchio appears, the priority/weight of segment 1 would be highest and the priority/weight of segment n+2 would be the lowest. For example, segment 1 may include sections in which the front of Pinocchio appears in close-up while segment n+2 includes a video clip in which the back of Pinocchio appears in the background for a brief moment.

As described above, by assigning priority/weight information based on the semantic elements as an attribute of the link information between semantic elements and corresponding segments, a more effective browsing and searching of a multimedia is allowed for a user. For example, assume that a user is searching the contents of the story Pinocchio based on the semantic elements for the character Pinocchio. The link information 303 of the segments linked with the semantic element Pinocchio would be used to display the sections in which Pinocchio appears. However, using the priority/weight information of the link information 303, the segments of the structure elements 301 which corresponds to the semantic element Pinocchio can be displayed, in sequence, from the highest to the lowest priority/weight.

Furthermore, more than one semantic element may be described in a segment of the structure information and, depending upon the segment, the priorities/weights of the semantic elements would vary. For example, even though Pinocchio is the most important semantic element in the story of Pinocchio, the appearance of Pinocchio in the background of a scene in which Geppetto is speaking to neighbor is not significant to the story. In such segments, Geppetto would be the more important semantic element. Thus, it would also be helpful for a user to know the relative priorities/weights of semantic elements such as concepts, objects, or events described in each segment of the structure information. Such priority/weight information may be represented by another attribute of the link information.

FIG. 4 shows a second embodiment of a structure for describing the priority/weight information based on the structure elements including structure elements 401 of a plurality of segments connected to semantic elements 402 by link information 403 with priority information. As in the first embodiment, the priority/weight of the link information 403 is represented by numbers written on arrows from the structure elements 401 to corresponding semantic elements 402. Here, the link information 403 may be represented by connectors, relations, or locators. Thus, the priority/weight or weight of the link information 403 may be another one of an attribute of the link information 403.

In the link information 403 of FIG. 4, a segment n+2 connects to semantic elements Pinocchio, the Cricket Pepe, and the concept of adventure. Here, the priority/weight of the link information 403 to Pinocchio is '0.3,' the priority/weight of the link information 403 to the Cricket Pepe is '0.7,' and the priority/weight of the link information 403 to the concept of adventure is '0.8.' Assuming that the priority/weight ranges from 0 to 1, even though Pinocchio may be the most important semantic element of the story, the priority/weight of the concept of adventure is higher than the priority/weight of Pinocchio for the segment n+2.

Therefore, by assigning priority/weight information based on the structure elements as an attribute of the link information between segments and corresponding semantic elements, a more effective browsing and searching of a multimedia is allowed for a user. For example, assume that a user is searching the contents of the story Pinocchio based on the structure elements by viewing a segment n. The link information 403 of the semantic elements linked with the segment n would be used to display the whole segment. However, using the priority/weight information of the link information 403, the semantic elements can be displayed in order from the highest to the lowest priority/weight, and scenes or shots of the segment describing the corresponding semantic elements may be displayed, in sequence, from the highest to the lowest priority.

In the above data structures based on either semantic elements of FIG. 3 and structure elements of FIG. 4, the priority/weight information is included as an attribute of the link information between the semantic elements and the structure elements, wherein the link information describes the priority/weight of either structure elements based on the semantic elements or semantic elements based on the structure elements. FIG. 5 shows a third embodiment of a structure for describing the priority/weight based on both the semantic elements and based on the segments, where the priority/weight is an attribute of the link information.

Referring to FIG. 5, a link ID represents identifications of the link information between segments and semantic elements, wherein link Li connects segment Sj with semantic element Mk. For each link Li, the priority/weight information includes both priority/weight of corresponding segment Sj based on semantic element Mk, i.e. semantic based importance, and priority/weight of corresponding semantic element Mk based on segment Sj, i.e. segment based importance.

The value which represents the priority/weight may be set to a fixed range of integers or a real numbers, or integers or real numbers without a fixed range. In the preferred embodiment, the value of the priority is fixed between '0' and '1.' Accordingly, if there is no change in the stored segments, the assigned values of the priority/weight information may be normalized and controlled to a number between '0' and '1,' regardless of the range of priority/weight values assigned. Also, an authorized user (or a manager) may subjectively assign the priority/weight information, which may be modified by further study or input.

However, in a system in which the priority/weight values are assigned without a fixed range or if there is a continuous change in the stored data, normalization cannot be achieved or the priority/weight values must be normalized each time there is a change in the data. In such case, one method to set the priority/weight information, described by a real number, to a value between '0' and '1' is as follows.

For an image, the priority/weight value may be set by a ratio $I_p$ which is the amount of a semantic element that occupies an image [$I_p$=pixel number of semantic image/total image pixel number]. For a video clip, the priority/weight value may be set by a temporal ratio $V_p$ which is the length of a section in which a semantic element appears [$V_p=I_p\times$(time describing semantic element/total segment time)]. For an audio, the priority/weight value may be set by a ratio $A_p$, a combination of the degree of sound pressure of a semantic element and the length of time in which the sound is heard [$A_p$=(sound pressure of semantic element/total sound pressure)×(time of sound pressure of semantic element/segment time)]. Thus, the priority/weight information can automatically be set to a value between '0' and '1.'

As described above, when the priority/weight is represented by an attribute of the link information, the efficiency of the browsing and storage are increased. First, the semantic elements need only be stored once in the semantic structure, such that it is not necessary to redundantly store the semantic elements. Second, when the semantic information is separated from the structure information, the link information exists regardless of the priority/weight information. Thus, the priority/weight information may be added to the link information as attributes using one or two real numbers, thereby reducing the size of data for describing the priority/weight information.

Furthermore, when a user wishes to find a video clip related to a specific semantic element during a search, a search engine may obtain the semantic element from the semantic structure and the link information corresponding to the semantic element from the link information. The search engine then delivers segments designated by the obtained link information together with the priority/weight information to the user. Therefore, the user may view segments according to the priority/weight information which is quantitatively represented. Similarly, when a user wishes to find information in a specific segment during a search, related semantic elements described in the segment may be obtained using the link information corresponding to the segment, thereby allowing the user to view the semantic elements related to the segment.

In the present invention, when a multimedia data has link information between semantic elements and structure elements for search of multimedia based on content, the link information includes priority/weight information as an attribute such that the efficiency of the search, storage, and browsing of the multimedia are increased. Moreover, the priority/weight information may automatically be extracted and represented, case by case, such that indexing of the multimedia may be effectively performed.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A computer readable medium having stored thereon:
   a structure information of a plurality of segments;
   a semantic information of a plurality of semantic elements; and
   a link information which connects at least one selected segment to at least one semantic element, wherein said link information includes, as an attribute, at least one of a priority or weight information between each connected at least one segment and at least one semantic element.

2. The medium of claim 1, wherein the information forms a link from a selected semantic element to each segment which describes the selected semantic element.

3. The medium of claim 2, wherein the priority or weight information is based on the semantic element and indicates the importance of the selected semantic element in each of the linked segments.

4. The medium of claim 1, wherein the link information forms a link from a segment to each semantic element which is described in the selected segment.

5. The medium of claim 4, wherein the priority or weight information is based on the segment and indicates the importance of each linked semantic element in the selected segment.

6. A multimedia data structure The medium of claim 1, wherein the link information includes semantic based importance of a segment and segment based importance of a semantic element between the connected at least one segment and at least one semantic element.

7. The medium of claim 1, wherein the link information is represented by one of connectors, relations, or locators.

8. The medium of claim 1, wherein the priority or weight information is a value ranging from 0 to 1, where the value of 1 has the most importance.

9. The medium of claim 8, further comprising:
   setting one of a priority or a weight value for an image to a ratio which is an amount of a semantic element that occupies the image;
   setting a corresponding one of a priority or weight value for a video clip by a temporal ratio which is the length of a section in which a semantic element appears in a segment; and
   setting a corresponding one of a priority or weight value for an audio by a ratio which is a combination of the degree of sound due to a semantic element and the length of time in which the sound is heard during a segment.

10. A method for browsing multimedia, comprising:
    receiving a predetermined selection of either a semantic element from semantic information or a segment from structure information;
    obtaining link information corresponding to a selected semantic element or segment, wherein the link information includes at least one of a priority or weight information as an attribute of the link information;
    displaying segments linked with a selected semantic element in sequence according to the priority or weight information using the link information, if a semantic element is selected for browsing based on semantic elements; and
    displaying sections which describe semantic elements linked with a selected segment in sequence according to the priority or weight information using the link information, if a segment is selected for browsing based on segments.

11. The method of claim 10, wherein the link information connects a selected segment to at least one semantic element if a segment is selected, and wherein the link information connects a selected semantic element to at least one segment if a semantic element is selected.

12. The method of claim 10, wherein the link information forms a link from a semantic element to each segment which describes the selected semantic element.

13. The method of claim 12, wherein the priority or weight information is based on the first semantic element and indicates the importance of the selected semantic element in each of the linked segments.

14. The method of claim 10, wherein the link information forms a link from a segment to each semantic element which is described in the selected segment.

15. The method of claim 14, wherein the priority or weight information is based on the segment and indicates the importance of each linked semantic element in the selected segment.

16. The method of claim 10, wherein the link information is represented by one of connectors, relations, or locators.

17. The method of claim 10, wherein the priority or weight information is a value ranging from 0 to 1, where the value of 1 indicates the most importance.

18. A method of using a computer processor for displaying multimedia in a multimedia browsing system, comprising:
    storing a structure information of a plurality of segments, and a semantic information of a plurality of semantic elements;
    storing link information which links at least one segment to corresponding at least one semantic element, wherein said link information includes, as an attribute, at least one of a priority information or weight information between the connected at least one segment and at least one semantic element;
    obtaining link information corresponding to a semantic element or a segment, selected by a user for browsing; and
    producing and displaying segments linked with a selected semantic element in sequence according to the priority or weight information using the link information, if a semantic element is selected for browsing based on semantic elements; and
    producing and displaying sections which describes semantic elements linked with a selected segment in sequence according to the priority or weight information using the link information, if a segment is selected for browsing based on segments.

19. The method of claim 18, wherein the priority or weight information of the link information includes semantic based importance of a segment and segment based importance of a semantic element between the connected at least one segment and at least one semantic element.

20. The method of claim 18, wherein the link information is represented by one of connectors, relations, or locators.

21. A method for generating multimedia data, comprising:
   receiving a predetermined selection of either a semantic element from semantic information or a segment from structure information;
   obtaining link information corresponding to a selected semantic element or segment, wherein the link information includes a strength of the link information indicating the strength of a relationship between the semantic element and the segment of the selected semantic element; and
   identifying a plurality of corresponding multimedia data ranked according to said strength of the link information.

22. The method of claim 21, wherein the strength of the link information comprises semantic based importance of a segment and segment based importance of a semantic element between the connected at least one segment and at least one semantic element.

23. The method of claim 21, wherein the link information comprises one of connectors, relations, or locators.

24. A method performed by a computing device, comprising:
   receiving a predetermined selection of either a semantic element from semantic information or a segment from structure information;
   forming a computer readable medium including a data structure having link information corresponding to a selected semantic element or segment, wherein the link information includes a strength of the link information indicating the strength of a relationship between the semantic element and the segment of the selected semantic element; and
   searching a database of images for the selected semantic element or segment using the link information including the strength of the link information.

25. The method of claim 24, wherein the strength of the link information comprises semantic based importance of a segment and segment based importance of a semantic element between the connected at least one segment and at least one semantic element.

26. The method of claim 24, wherein the link information comprises one of connectors, relations, or locators.

* * * * *